Dec. 30, 1952   E. B. CANDELL   2,623,682
SHIPPING AND DISPLAY PACKAGE
Filed Dec. 28, 1949   4 Sheets-Sheet 1
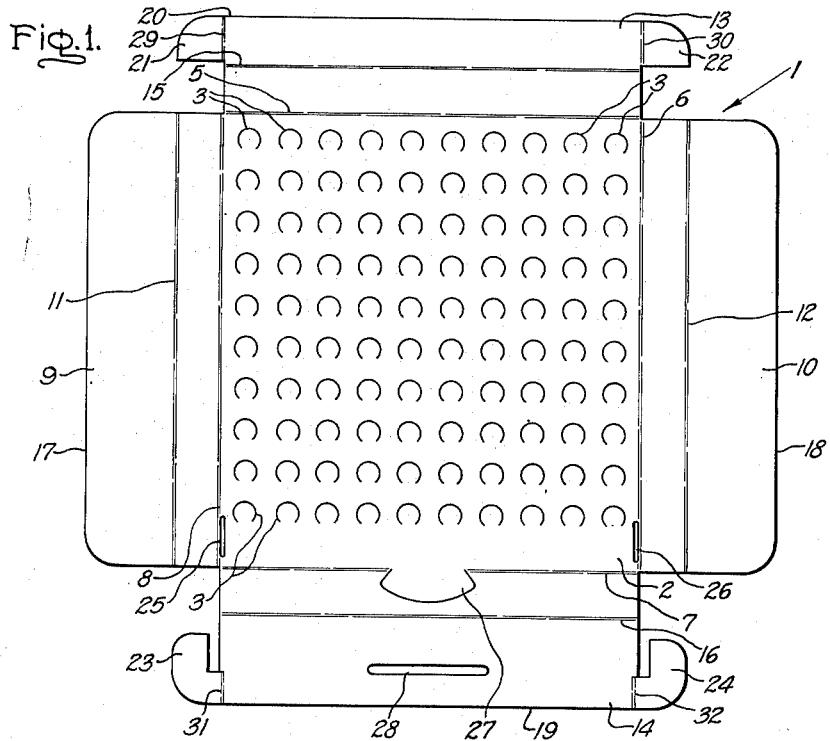
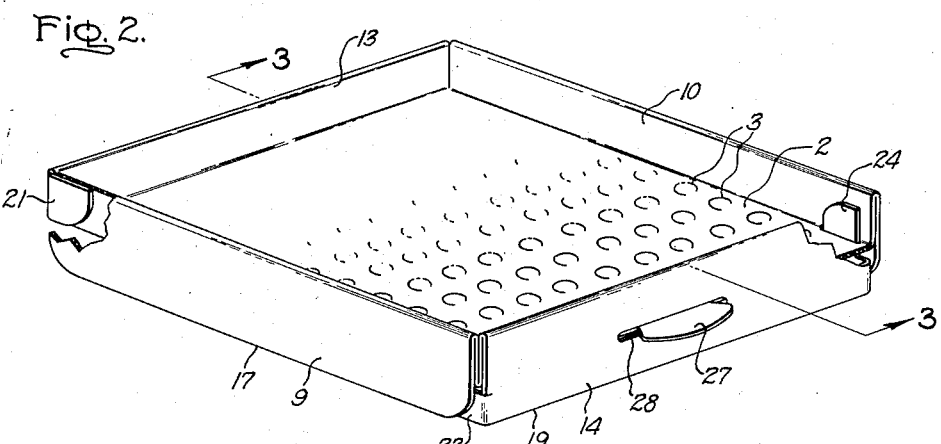
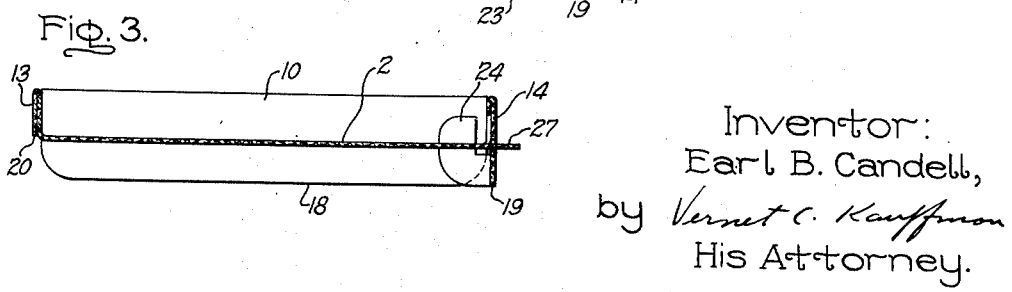
Inventor:
Earl B. Candell,
by Vernet C. Kauffman
His Attorney.

Dec. 30, 1952  E. B. CANDELL  2,623,682
SHIPPING AND DISPLAY PACKAGE
Filed Dec. 28, 1949  4 Sheets-Sheet 2
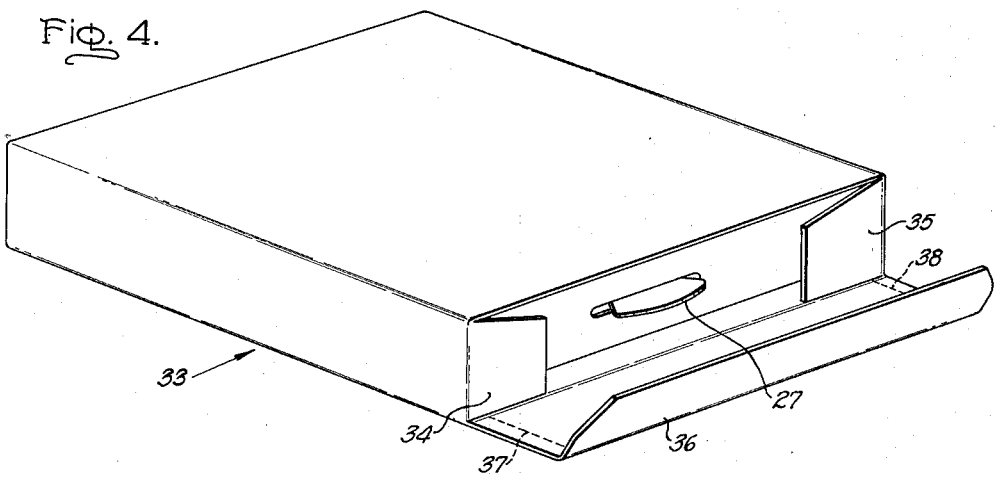
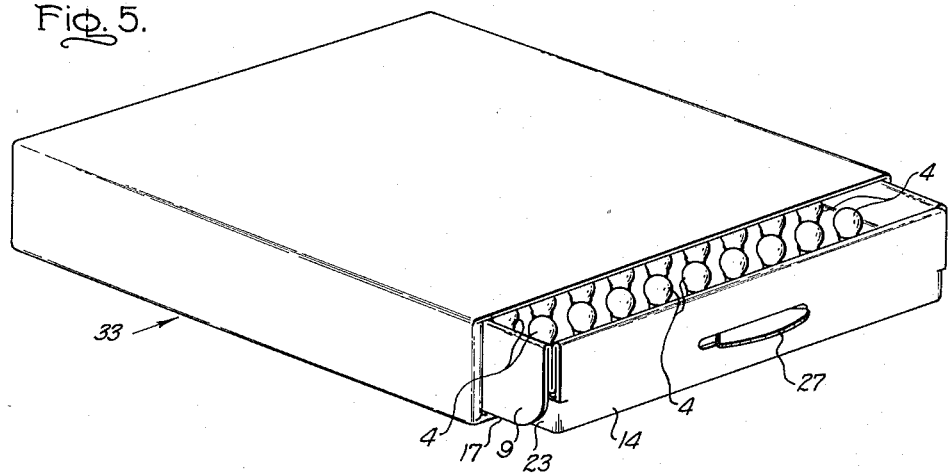
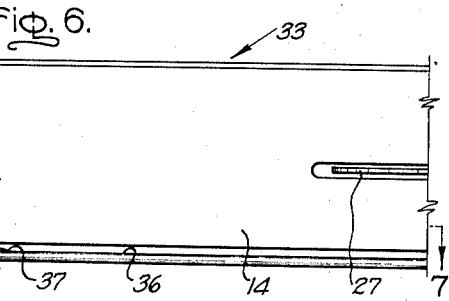
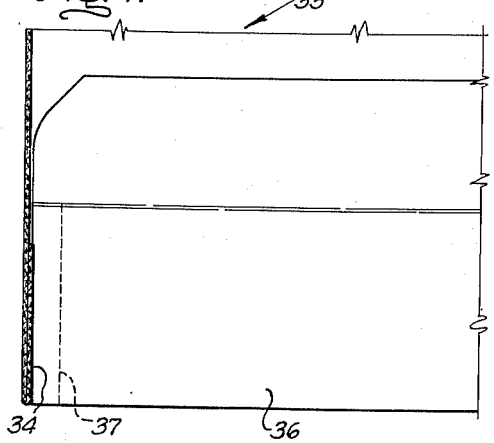
Inventor:
Earl B. Candell,
by Vernet C. Kauffman
His Attorney.

Dec. 30, 1952 — E. B. CANDELL — 2,623,682
SHIPPING AND DISPLAY PACKAGE
Filed Dec. 28, 1949 — 4 Sheets-Sheet 3
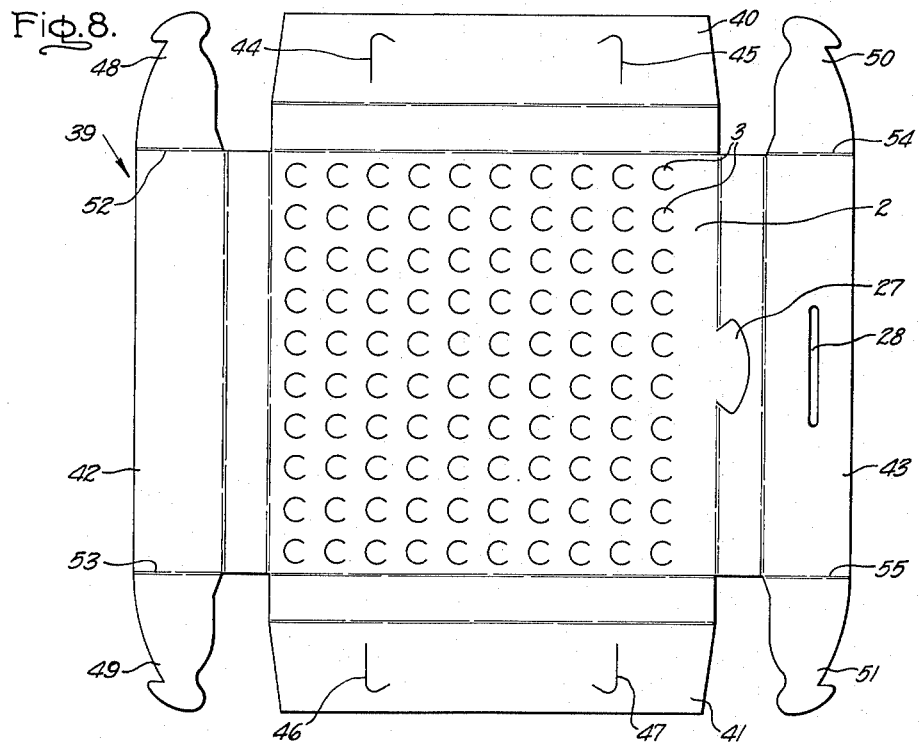
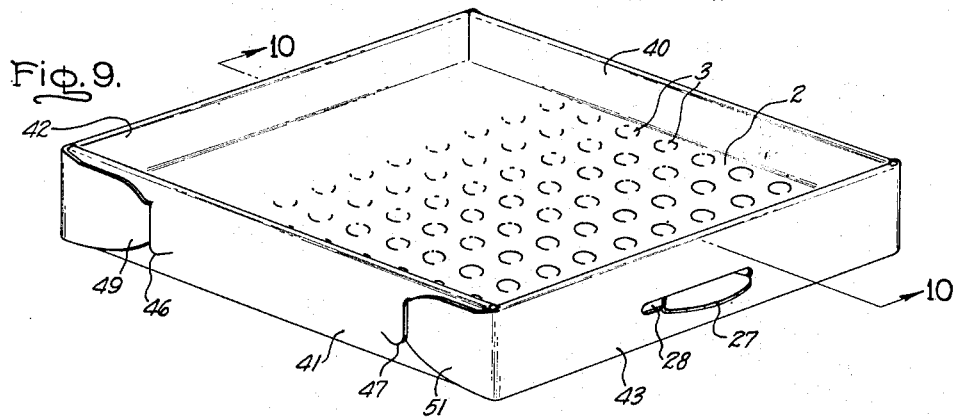
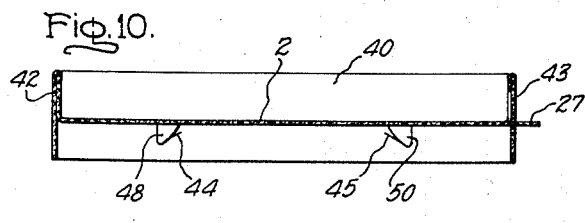
Inventor:
Earl B. Candell,
by Vernet C. Kauffman
His Attorney.

Dec. 30, 1952　　　　　E. B. CANDELL　　　　　2,623,682
SHIPPING AND DISPLAY PACKAGE
Filed Dec. 28, 1949　　　　　　　　　　　　　　　　4 Sheets-Sheet 4
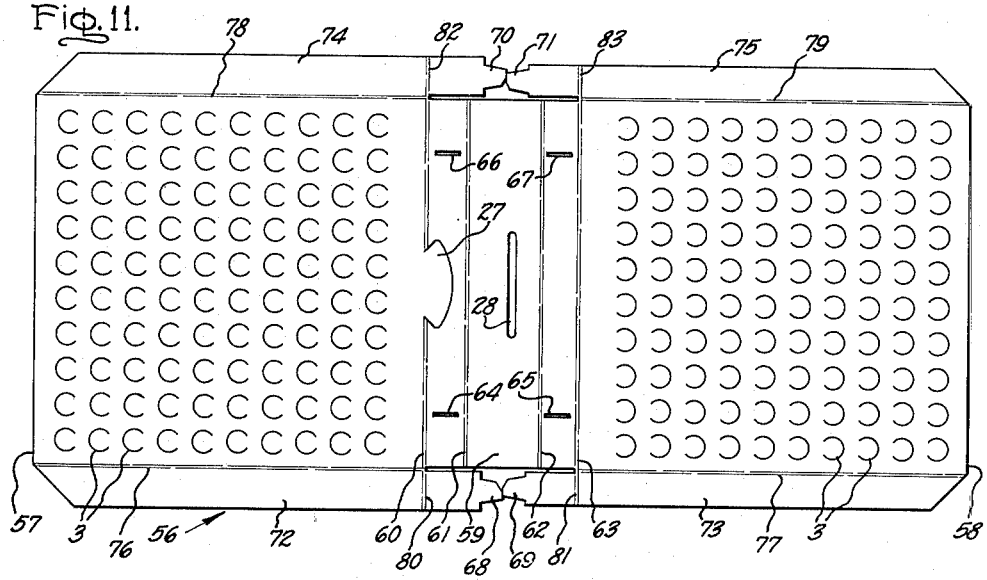
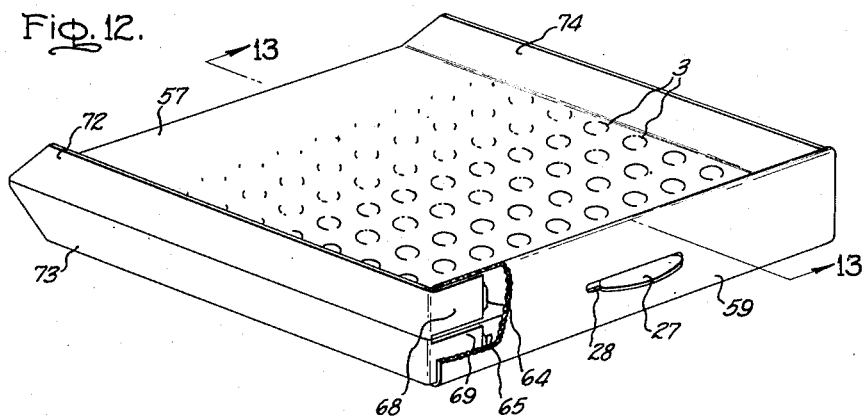
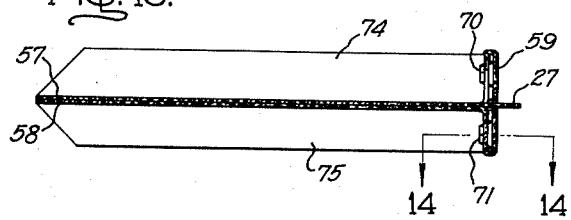
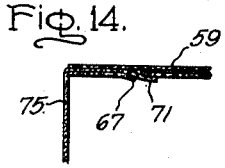
Inventor:
Earl B. Candell,
by Vernet C. Kauffman
His Attorney.

Patented Dec. 30, 1952

2,623,682

UNITED STATES PATENT OFFICE 2,623,682

SHIPPING AND DISPLAY PACKAGE

Earl B. Candell, Cleveland Heights, Ohio, assignor to General Electric Company, a corporation of New York Application December 28, 1949, Serial No. 135,513

3 Claims. (Cl. 229—19)

My invention relates to packing containers and is of interest in connection with packages for fragile articles, such as incandescent lamps, comprising glass bulbs.

The principal object of my invention is to provide a packing container for the shipping, display, and merchandising of small flashlight lamps, which has a tray including a platform for holding the lamps which tray is wholly or partially removable as a drawer from a carton for the purpose of displaying the lamps to the customer. Other objects and advantages of the invention will appear from the following particular description of species thereof and from the accompanying drawings in which Fig. 1 is a plan view of a blank properly cut and scored to form a tray useful in my invention; Fig. 2 is a perspective view of the tray properly folded and shaped in the form of a drawer; Fig. 3 is a sectional view along line 3—3 of Fig. 2; Fig. 4 is a perspective view of a carton in which the tray shown in Figs. 1 to 3 is inserted; Fig. 5 is a similar view of the carton showing the tray partially removed therefrom for displaying the lamps; Fig. 6 is a fragmentary end view of the carton showing the side flaps and tuck folded back into the carton in position to receive the tray therebetween; Fig. 7 is a fragmentary, top sectional view along the line 7—7 of Fig. 6 showing the side of the carton and one of the folded back flaps in section and, in full, the tuck in its folded back position; Fig. 8 is a top plan view of a blank properly cut and scored to form another type of tray useful in my invention; Fig. 9 is a perspective view showing the blank of Fig. 8 folded and secured together in the form of a tray; Fig. 10 is a sectional view along the line 10—10 of Fig. 9; Fig. 11 is a top view of still another blank properly cut and scored to form a tray useful in my invention; Fig. 12 is a perspective view of the blank shown in Fig. 11 properly folded and secured together to form a tray; Fig. 13 is a sectional view along the line 13—13 of Fig. 12; and Fig. 14 is a top sectional view taken along the line 14—14 of Fig. 13. Like numbers denote like parts in all the figures.

Referring to Fig. 1 of the drawings, the blank 1 consists of suitable paper material, such as chipboard and the like, which may be folded along a scored line without breaking. The center portion of the blank 1 constitutes a platform 2 and has a plurality of circular shaped cuts 3 therein arranged in a rectangular pattern ten to the side. The flashlight lamps 4 (Fig. 5) are easily inserted in the platform 2 by pressing their bases against the cut portions of the platform to bend back the said portions and provide openings for receiving and engaging the lamp bases.

The blank is scored along the lines 5, 6, 7, and 8 and has a pair of side pieces 9 and 10 each of which is scored along the lines 11 and 12. The blank 1 also has end pieces 13 and 14 scored along lines 15 and 16 which are at the same distance from the scored lines 5 and 7 are the scored lines 11 and 12 in the side pieces 9 and 10 are from the scored lines 8 and 6, respectively, and this distance is such that the sides of the tray formed by folding the blank 1 along the scored lines extend upward from the platform a slightly greater distance than the height of the glass bulbs of the flashlight lamps 4 mounted in the platform 2.

The outer edges 17 and 18 of the side pieces 9 and 10 and outer edge 19 of the front end piece 14 of the blank are at equal distances from the respective scored lines 11, 12, and 16 on said pieces and this distance is approximately twice that of the distance between the scored lines 8 and 11, 6 and 12, 7 and 16 so that the sides of the tray extend below the platform a slightly greater distance than the bases of the flashlight lamps 4 mounted in the platform 2. The distance between the edge 20 of the back end piece 13 is approximately equal to the distance between the scored line 15 thereon and the second line 5. The piece 13 has a pair of tabs 21 and 22 thereon and the front end piece 14 has a pair of tongues 23 and 24. The latter are insertable into slots 25 and 26 in the platform 2. The front end piece 14 also has a die cut tab 27 and a slot 28 for receiving the tab 27 when the blank 1 is folded to form the tray as described below.

In forming the tray, the blank 1, cut and scored as described above, is first folded upward along the scored lines 5, 6, 7, and 8. The end piece 13 is then folded outwardly and downwardly along the scored line 15 and the tabs 21 and 22 are folded along scored lines 29 and 30 and against side pieces 9 and 10. The tongues 23 and 24 are then folded outwardly along the scored lines 31 and 32 and the end piece 14 is then folded outwardly and downwardly along scored line 16 and the tongues inserted in the slots 25 and 26 as shown in Fig. 2. The tab 27 passes through the slot 28 when end piece 14 is thus folded. The forming of the tray is completed by folding the side pieces 9 and 10 along the scored lines 11 and 12, respectively, all as shown in Fig. 2. The tabs 21 and 22 on the back of the tray may be fastened with adhesive and this may also be done with tongues 23 and 24 on the front of the tray.

The platform tray of Figs. 1 to 3 after being filled with the flashlight incandescent lamps 4 in the manner described above is inserted in the carton 33 shown in Fig. 4 which is of conventional design except for the end thereof shown partially opened in the figure. After the tray has been inserted in the carton 33 through its open end, the side flaps 34 and 35 and the tuck 36 of the carton 33 may be folded over to close the opening. The carton 33 with the inserted tray is then ready for use as a shipping container to the dealer or retailer and the carton and the tray provides ample protection for the lamps from the physical shocks incident to its transportation.

The unopened package may also be used for storing the lamps on the shelves of the dealer or retailer since it is a compact package holding a relatively large number of lamps and occupying a minimum of space on the dealers' shelves.

It may also be used as a display container either on the counter, or in or on a showcase; and, in its latter use, the tray may be partially withdrawn from the carton to display the lamps 4 mounted in the platform 2 as shown in Fig. 5 of the drawing. The tray thus constitutes a drawer in the carton.

In setting up the package for display purposes, the tray is removed from the carton after opening the tuck 36 and the side flaps 34 and 35. The side flaps 34 and 35 are then turned back into the carton to lie flat along the sides of the carton. These flaps are kept in place by then bending the tuck 36 inside the carton. Scored lines 37 and 38 relieve the pressure on the tuck 36 for this operation, the material bending up to form a fillet in the corners. The fillets thus formed engage the bottom edges 17 and 18 of the side pieces 9 and 10 of the tray when the latter is reinserted in the carton through the opening provided by the inwardly bent flaps 34 and 35 and the tuck 36 and both the flaps and the tuck frictionally engage the tray to retain it in any desired position within the carton 33. The tray is readily moved with respect to the carton 33 by the tab 27 which is easily gripped by the fingers of the merchandiser. Thus, the carton 33 may be mounted substantially vertically with the tray slightly withdrawn from its upper open end as shown in Fig. 5 for displaying the lamps therewithin. Also, when the tray contains an assortment of flashlight lamps of various types, it may be pulled out of the carton a sufficient distance to give access to the particular type of flashlight lamp requested by the customer. The tray thus constitutes an easily opened and shut drawer for facilitating merchandising of the lamps 4.

The tray illustrated in Figs. 8 to 10 of the drawing is made from a blank 39 of the same material as the blank 1 and is similar in size and shape to that shown in Figs. 1 to 6. It is useful as a drawer in the carton 33 shown in Figs. 4 to 7. As shown, the tray comprises a platform 2 having circular cuts 3 therein and has also a tab 27 projecting through a slot 28 in its front end piece all as shown and discribed above. The side pieces 40 and 41 and the end pieces 42 and 43 of this embodiment of the tray are also similar to the corresponding parts of the tray illustrated in Figs. 1 to 6 and are scored and folded in a similar manner to form the sides of the tray, but the tray is held together in a different manner. Thus, the side pieces 40 and 41 have a pair of curved slits 44 and 45, 46 and 47 therein, respectively, through which are inserted the hook-shaped end portions 48 and 49, 50 and 51 of the two end pieces 42 and 43, respectively. In forming the tray, the properly cut and scored blank is folded along the scored lines of the side pieces 40 and 41, and the end pieces 42 and 43 are then folded as in the folding of the corresponding parts of the blank 1 of Fig. 1. The end pieces are then bent along the scored lines 52 and 53, 54 and 55, respectively, and their ends 48 and 51 inserted into the slits 44 to 47 and hooked behind the slotted portions of the side pieces 40 and 41, as shown in Figs. 9 and 10 of the drawing, thus locking the various parts of the tray together.

The embodiment of the tray shown in Figs. 11 to 14 is also useful as a drawer in the carton 33 illustrated in Figs. 4 to 7, is similar in size and shape to the trays described above in connection with Figs. 1 to 10 and is made from a blank 56 of the same material as the blanks 1 and 39. In this embodiment, however, the blank 56 has two end portions 57 and 58 each of which has the circular cuts 3 therein. The center portion 59 of the blank is scored along four parallel lines 60, 61, 62, and 63 and also has the die cut tab 27 and the slot 28 for accommodating the tab 27. The center portion 59 has also four slits 64, 65, 66, and 67 transverse to lines 60 to 63 for receiving the tongues 68, 69, 70 and 71, respectively, which are prolongations, respectively, of sides 72, 73, 74, and 75 of the end portions 57 and 58. The blank 56 is also scored along lines 76, 77, 78, and 79 so that the sides 72 to 75 may be folded normal to the portions 57 and 58 and along lines 80, 81, 82 and 83 so that the tongues 68 to 71 may be folded for insertion into slits 64 to 67, respectively.

In shaping the tray shown in Figs. 12 to 14 from the blank 56 shown in Fig. 11, the blank is folded along scored lines 62 and 63 so that the portion of the blank between said lines extends upward from and is normal to the portion 58. The sides 73 and 75 of the portion 58 are then folded upwardly along the scored lines 77 and 79, the tongues 69 and 71 are folded inwardly along the scored lines 81 and 83 and inserted in the slits 65 and 67, respectively. The portion 58 then has three upstanding sides constituted by the sides 73 and 75 and the portion of the blank between the scored lines 62 and 63.

Similarly, the blank is then folded along scored lines 60 and 61 so that the portion of the blank between said lines extends upwardly from and is normal to portion 57. Sides 72 and 74 are then folded upwardly along scored lines 76 and 78, respectively, and tongues 68 and 70 are folded along scored lines 80 and 82 and inserted in slits 64 and 66. At this stage, the portions 57 and 58 are each provided with three upstanding sides.

The folding of the blank 56 is completed by bending the center portion along scored lines 61 and 62 to move the tongue 27 into the slot 28 and bring the portions 57 and 58 together as shown in Fig. 12 with their sides extending in opposite directions. The circular cuts 3 in each of the portions 57 and 58 index with the cuts in the other of said portions so that the lamp bases extend through both portions when they are inserted as described above in the platform made up of the two portions 57 and 58. The lamp bases are firmly held in the composite platform and also serve to hold the two portions 57 and 58 together. As in the embodiments of the tray described above, the sides of the two portions 57 and 58 extend above and below the composite platform a distance slightly greater than the lamp bulbs and the lamp bases extend from the platform.

From the above description, it is apparent that the packing container is one easily fabricated by automatic machinery and is readily folded into desired shape by simple manipulations, requires no adhesives for holding any of its parts permanently together and facilitates the shipment, storage and display of flashlight lamps.

What I claim as new and desire to secure by Letters Patent of the United States is:

1. A packing and display container comprising in combination, a carton and a tray within said carton, said tray having a platform for supporting articles in spaced relation to the walls of said carton, an end of said carton having foldable flaps and a tuck adapted to close said carton during transportation of said container and to be folded inwardly to provide an opening in said carton through which said tray is slidable as a drawer for displaying and providing access to said articles, said tuck having transverse lines of weakness adjacent its ends along which it is bent when folded inwardly so that the bent portions of the inwardly folded tuck frictionally engage the edges of the sides of said tray as the latter is moved into and out of said carton.

2. A tray for a plurality of flash light lamps having a platform having a plurality of cut portions for receiving the bases of said lamps, the sides of said tray extending above and below said platform a distance greater than the parts of said lamps extend therefrom, one of said sides being integral with said platform and extending upwardly from said platform a distance greater than the upwardly extending parts of the said lamps and then downwardly below the platform a distance greater than the length of the lamp parts below said platform, said downwardly extending portion of said side having a slot therein, said tray comprising also a finger grippable tab integral with and extending from said platform through the said slot in said side whereby said tray with said lamps is readily insertable into and removable from a carton.

3. A tray for a plurality of flash light lamps having a platform having a plurality of cut portions for receiving the bases of said lamps, the sides of said tray being integral with said platform and extending upwardly from said platform a distance greater than the upwardly extending parts of said lamps and then downwardly below the platform a distance greater than the length of the lamps below said platform, the downwardly extending portion of one of said sides having a slot therein, said tray comprising also a finger grippable tab integral with and extending from said platform through the said slot in said side whereby said tray with said lamps is readily insertable into and removable from a carton.

EARL B. CANDELL.

REFERENCES CITED

The following references are of record in the file of this patent:

UNITED STATES PATENTS

| Number | Name | Date |
| --- | --- | --- |
| 944,063 | Warren | Dec. 21, 1909 |
| 1,449,961 | Wallace | Mar. 27, 1923 |
| 1,504,292 | Wickes | Aug. 12, 1924 |
| 1,858,216 | Colon | May 10, 1932 |
| 2,162,089 | Kagen | June 13, 1939 |
| 2,201,197 | Minor | May 21, 1940 |
| 2,318,655 | Zalkind | May 11, 1943 |